(12) United States Patent
Hayata et al.

(10) Patent No.: US 6,268,097 B1
(45) Date of Patent: Jul. 31, 2001

(54) ELECTROPHOTOGRAPHIC PHOTORECEPTOR

(75) Inventors: Hirofumi Hayata; Kazumasa Watanabe, both of Hino; Kenichi Yasuda, Hachioji, all of (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/468,382

(22) Filed: Dec. 20, 1999

(30) Foreign Application Priority Data

Dec. 21, 1998 (JP) .................................................. 10-362802

(51) Int. Cl.⁷ ....................................................... G03G 5/06
(52) U.S. Cl. ............................................... 430/78; 540/122
(58) Field of Search ................................ 430/78; 540/122

(56) References Cited

U.S. PATENT DOCUMENTS 6,022,656 * 2/2000 Visser et al. ....................... 430/58.65
6,051,702 * 4/2000 Bird et al. .............................. 540/122

* cited by examiner

*Primary Examiner*—John Goodrow
(74) *Attorney, Agent, or Firm*—Jordan B. Bierman; Bierman, Muserlian and Lucas

(57) ABSTRACT

An electrophotographic photoreceptor is disclosed. The photoreceptor comprises pigment particles obtained by incorporating one or more metal atom into polycyclic anhydride-aromatic diamine condensation compound particles.

13 Claims, 8 Drawing Sheets

ELECTROPHOTOGRAPHIC PHOTORECEPTOR

FIELD OF THE INVENTION

The present invention relates to an electrophotographic photoreceptor and more specifically to an electrophotographic photoreceptor comprising pigment particles containing a phthalocyanine compound having a metal atom or a centered metal atom in a polycyclic anhydride-aromatic diamine condensation compound particles, and an electrophotographic image forming method employing said photoreceptor.

BACKGROUND OF THE INVENTION

After the discovery of an electrophotographic photoreceptor employing a charge transfer complex comprised of 2,4,6-trinitro-9-fluorenone and poly-N-vinylcarbazole, the development of organic electrophotographic photoreceptors has progressed, and continuing enhancement of sensitivity, durability, and the like of the photoreceptor has been reported year by year. Furthermore, function separating type organic photoreceptors have been developed, and hitherto, various such compounds have been reported.

Regarding charge generating substances, in order to meet requirements for consistent high speed and high sensitivity functions, azo pigments, condensed polycyclic pigments, various types of phthalocyanine pigments, and the like are reported and high sensitivity materials have been developed for each of said pigments.

However, when the enhancement of a simple charge generating efficiency is put aside, needs for the charge generating substances have not been satisfied, and the following problems have not yet been overcome. It is difficult to allow the azo pigments to exhibit a stabilized function at high levels due to difficulty in the enhancement of their purity. The phthalocyanine based pigments exhibit problems, in which the variation of their function due to ambient difference such as temperature, humidity, and the like is relatively large, and when employed repeatedly over a long period of time, a charge potential obtained immediately after inactivity is lower than that obtained in a second rotation. A first rotation, a second rotation, etc. of the photoreceptor as described herein mean that when the photoreceptor starts rotation in accordance with electrical instruction for image formation, the first rotation is designated as a first rotation, and the following rotation is designated as a second rotation, a third rotation, and the like. The aforementioned phenomenon occurs markedly during reversal development. The quality of a-copy image formed by a first-rotation of the photoreceptor is definitely inferior to those obtained by the following rotation. In addition to this, as an image problem, background stain is likely to be noticed because stain is formed on the background which is to be white.

In order to overcome these problems, necessarily, an image forming process is accepted in which charge potential is stabilized by exposing the photoreceptor without forming an image during a first and following several rotations of the photoreceptor. As a result, electrical power is wasted during idling of the photoreceptor and time is also wasted until a first image copy sheet is outputted. Accordingly, it is desired to solve the problems which are a barrier to cleaner global environment, to protect resources, and to achieve high speed processing.

On the other hand, the condensed polycyclic pigments exhibit excellent stability. However, many of them have short absorption wavelengths and have no practical sensitivity for a semiconductor laser beam which has been employed as a digital light source in recent years. Of them, bisimidazole perylene exhibits a high charge generating efficiency even in the wavelength region near 700 nm and is excellent in the stability of electrophotographic properties under variations in the environment, as well as during the use over a long period of time. However, bisimidazole perylene causes problems in which during continuous exposure with high intensity, the sensitivity decreases markedly. Accordingly usable conditions are limited because when a semiconductor laser with high intensity is employed as a light source, the sensitivity is extremely decreased.

Generally, when a plurality of pigment particles and the like are mixed and employed in an electrophotographic photoreceptor, the following are employed: each of the types of pigment particles is separately prepared and such different types of pigment particles are mixed, and a visually uniform state is obtained by employing means such as dispersion and the like, or initially, finely dispersed particles of different types of pigments are prepared by means of dispersion and the like, and mixed to obtain the uniform state. According to Japanese Patent Publication Open to Public Inspection No. 7-128889 and the like, gallium phthalocyanine and a bisimidazole perylene compound are mixed employing the aforementioned method, so that a charge generating layer is formed.

On the other hand, a method is known, in which during the preparation of particles, a plurality of materials are temporarily and uniformly mixed employing means such as dissolution and the like, and thereafter, particles composing those materials simultaneously are prepared. Examples of such means include co-deposition, acid paste treatment, and melt mixing. Examples, in which charge generating agents are prepared employing such means, are described in Japanese Patent Publication Open to Public Inspection No. 7-114196 (titanyl phthalocyanine/perylene bisimido mixing), Japanese Patent Publication Open to Public Inspection No. 9-157540 (mixing of different types of phthalocyanines), Japanese Patent Publication Open to Public Inspection No. 3-50553 (mixing of different types of phthalocyanines, and naphthalocyanines), Japanese Patent Publication Open to Public Inspection No. 7-5715 (mixing of metal free phthalocyanine/perylenecarboxylic acid diimido and diimidazole), Japanese Patent Publication Open to Public Inspection No. (titanyl phthalocyanine/metal free phthalocyanine), and the like.

However, the objects of these inventions are mainly to develop the new crystal form, to broaden the spectral sensitivity region, and to increase sensitivity, but these inventions do not disclose any means to solve the aforementioned problems of light fatigue due to high intensity exposure and variation of charging properties after repeated use.

As described above, a charge generating material employable for the electrophotographic photoreceptor has not yet been discovered which exhibits both ideal electrophotographic properties and stability.

SUMMARY OF THE INVENTION

An object of the present invention is to provide pigment particles which achieve the performance described below, a production method of the same, and an electrophotographic photoreceptor employing said pigment particles, and an electrophotographic image forming method.

Fatigue due to exposure at high intensity of light is minimal.

Even when images are again formed after repeated use, or images are formed after some period of inactivity, differences in charging properties between the first rotation and the second rotation or the following rotation are minimized so that an excellent image is formed from the first rotation.

Electric potential as well as image formation is not affected much by variation in ambient conditions such as high temperature, high humidity, low temperature, low humidity, and the like.

During repeated use, variation in photoreceptor properties is minimal and uniform images are obtained consistently.

The present invention and embodiments thereof will now be described.

An electrophotographic photoreceptor comprised of pigment particles obtained by incorporating one or more metal atom into polycyclic anhydride-aromatic diamine condensation compound particles.

An electrophotographic photoreceptor in which the number of condensed rings of said polycyclic anhydride-aromatic diamine condensation compound is between 2 and 7.

An electrophotographic photoreceptor comprised of pigment particles obtained by incorporating at least one phthalocyanine compound having a centered metal atom in the polycyclic anhydride-aromatic amine condensation compound particles An electrophotographic photoreceptor in which the polycyclic anhydride-aromatic diamine condensation compound is Compound (1), bisimidazole perylene, represented by the structure described below.

Compound (1)

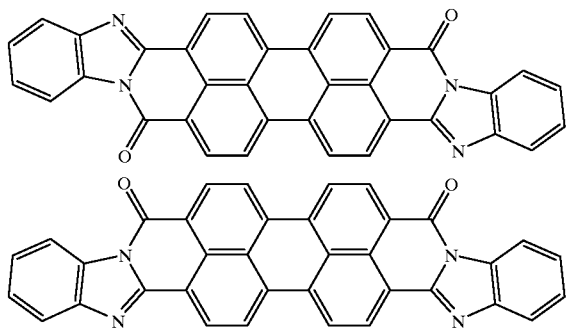

An electrophotographic photoreceptor in which said metal can be any of Ti, Cu, Fe, V, Ga, Si, Pb, Al, Zn, and Mg.

An electrophotographic photoreceptor in which the weight of said polycyclic anhydride-aromatic diamine condensation compound is at least the same as that of a phthalocyanine compound.

Pigment particles which are prepared by incorporating at least one phthalocyanine compound having a centered metal atom in bisimidazole perylene particles of which structure is shown as Compound (1), and the weight of the phthalocyanine compound having a centered metal atom is between at least 0.01 and below 50 percent of the total weight of the particles.

A production method for pigment particles in which after allowing a phthalocyanine compound having a centered metal atom and a polycyclic anhydride-aromatic diamine condensation compound to form a uniform solution, said pigment particles are obtained via a granulating process upon adding said solution into a poor solvent.

A production method of pigment particles in which after preparing a homogeneous solution by dissolving a phthalocyanine compound having a centered-metal atom and a polycyclic anhydride-aromatic diamine condensation compound in sulfuric acid, water is added to the resulting solution.

A method of forming an image wherein the photoreceptor mentioned above is employed and an image is formed from the first rotation of the photoreceptor by reversal development.

DETAILED DESCRIPTION OF THE INVENTION

Figure 1:
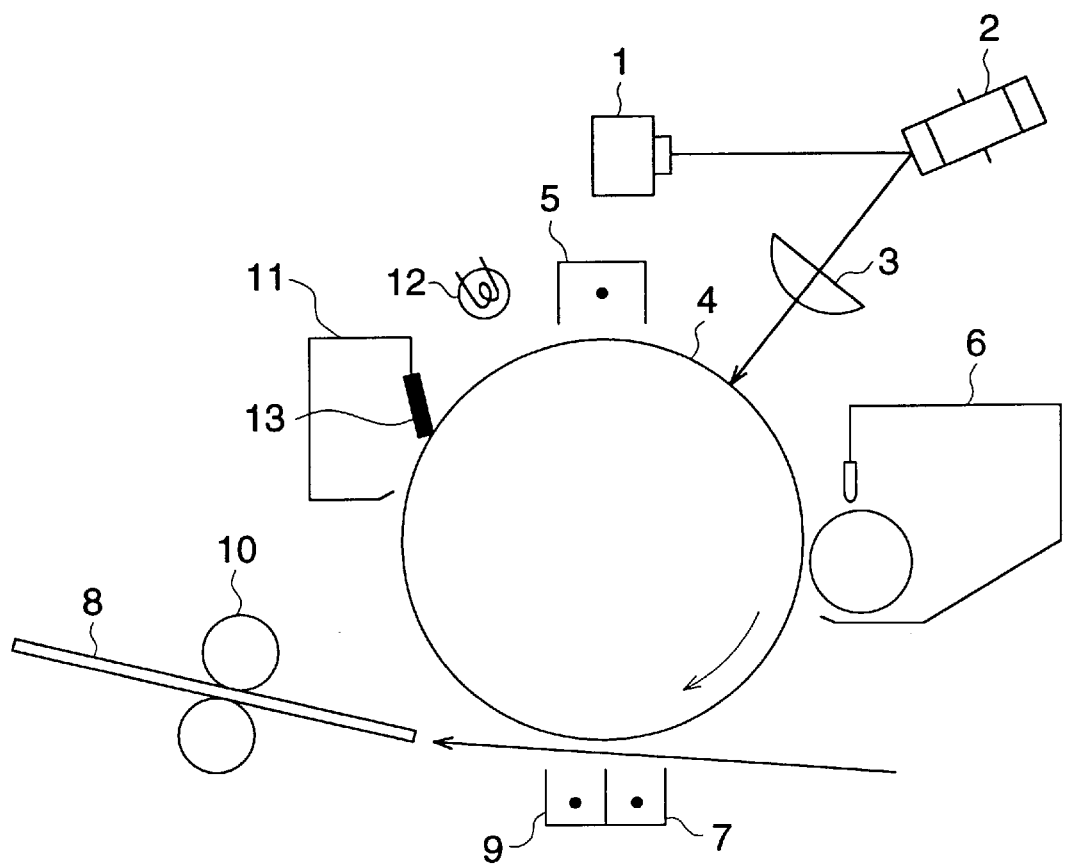
FIG. 1 is a cross-sectional view of a construction showing one example of the electrophotographic image forming method of the present invention.

A metal incorporated state in pigment particles will be described.

A plurality of substances and compounds employed as raw materials for pigments and blending of compound particles, i.e. pigment blending, will be described below.

Furthermore, during the production step of pigment particles, mixing of a plurality of substances at a molecular level is herein designated as a hybrid. Particles which are subjected to incorporation of a plurality of substances or compounds via said operation are designated as hybrid pigment or hybrid pigment particles. The pigment particles of the present invention relate to said hybrid pigment particles. In said hybrid pigment particles, a plurality of substances or compounds as raw materials of such pigments are temporarily allowed to form a uniform liquid state, and the resulting liquid is solidified to form particles.

The hybrid pigment particles will be now detailed.

First, the hybrid pigment particles are characterized in that said particles are produced via an operation in which a plurality of substances (for example, pigments and compounds containing a-metal atom) are temporarily mixed at the molecular level. Thereafter, a granulation operation is carried out. As a result, particles are formed as those which simultaneously incorporate a plurality of substances or compounds.

It is assumed that hybridized substances or compounds are incorporated into particles at the molecular state. It is also assumed that due to said incorporations, the impurity level in the energy levels of the semiconductor in a charge generating material is generated depending on the energy levels of the substance or compound as raw materials, and problems, which has been considered due to the trap level in the particles, have been overcome.

After the hybrid pigment particles, which are temporarily formed, are subjected to dispersion treatment and the like, and are finely dispersed in a state capable of forming a photosensitive layer, some types of hybridized substances or compounds are incorporated into the particles.

On the other hand, in pigment mixing, it is understood that in each stage from pigment particle preparation to mixing and dispersion, particles of a plurality of pigments exist independently. Some particles may aggregate or may penetrate into particles in the dissolved state. However, the resulting states are different from those of the hybrid pigment particles which are obtained from the uniform dispersion state at the molecular level, such as hybridization.

The electrophotographic photoreceptor, prepared by employing the specified hybrid pigment particles of the present invention obtained as described above, as a charge generating material, minimizes the decrease in sensitivity under exposure at high intensity of light and difference in chargeability between a first rotation after inactivity and a second rotation during repeated use. Further, said photoreceptor exhibits highly stable electrophotographic properties against variations in ambient conditions such as temperature and humidity, and further maintains excellent electrophotographic properties during repeated use over an extended period of time. Based on these excellent properties, it is possible to provide consistent electrophotographic images under various ambient conditions, as well as electrophotographic processing conditions. The polycyclic anhydride-aromatic diamine condensation compound as described in the present invention is referred to a condensation compound between cyclic anhydride and aromatic diamine. Listed as examples of these compounds are Compounds (1) through (16), shown below. Of these, the number of condensed rings is preferably between 2 and 7. For instance, 2 rings can be shown in Compound (2) and (3), 7 rings can be shown in Compounds (6) and (16), and 5 rings can be shown in other Compounds. Of these, the most preferred polycyclic anhydride-aromatic diamine condensation compound is bisimidazole perylene, shown as Compound (1). Compound (1) possesses structural isomers and Compounds (2) through (16) may each have an isomer in the same manner as above.

Compound (1)

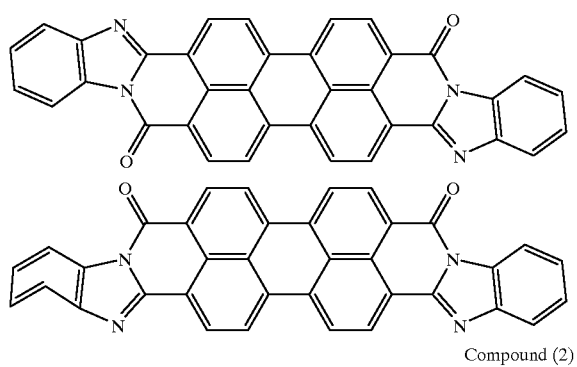

Compound (2)

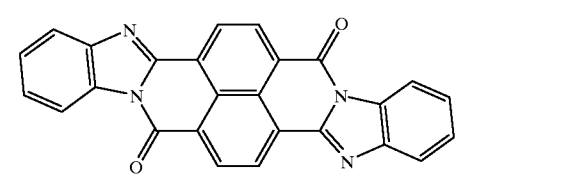

Compound (3)

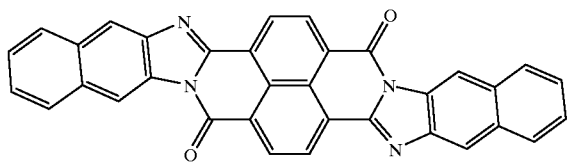

Compound (4)

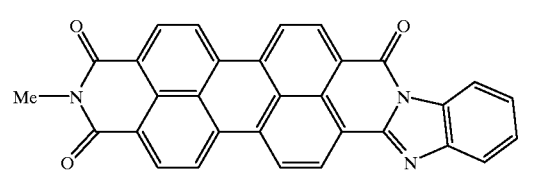

Compound (5)

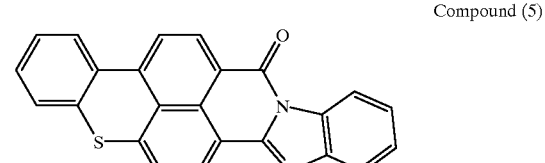

Compound (6)

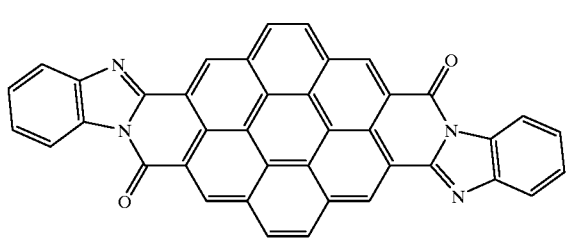

Compound (7)

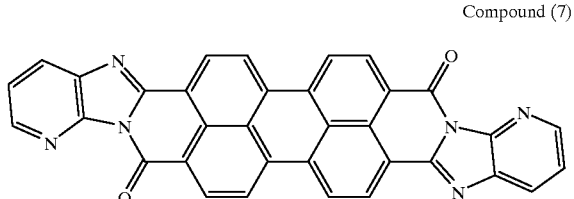

Compound (8)

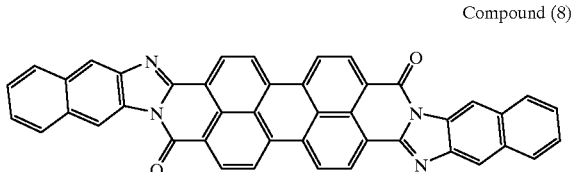

Compound (9)

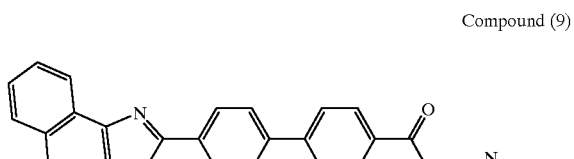

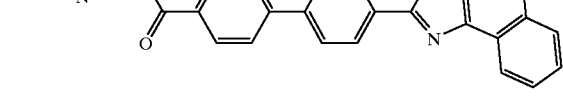

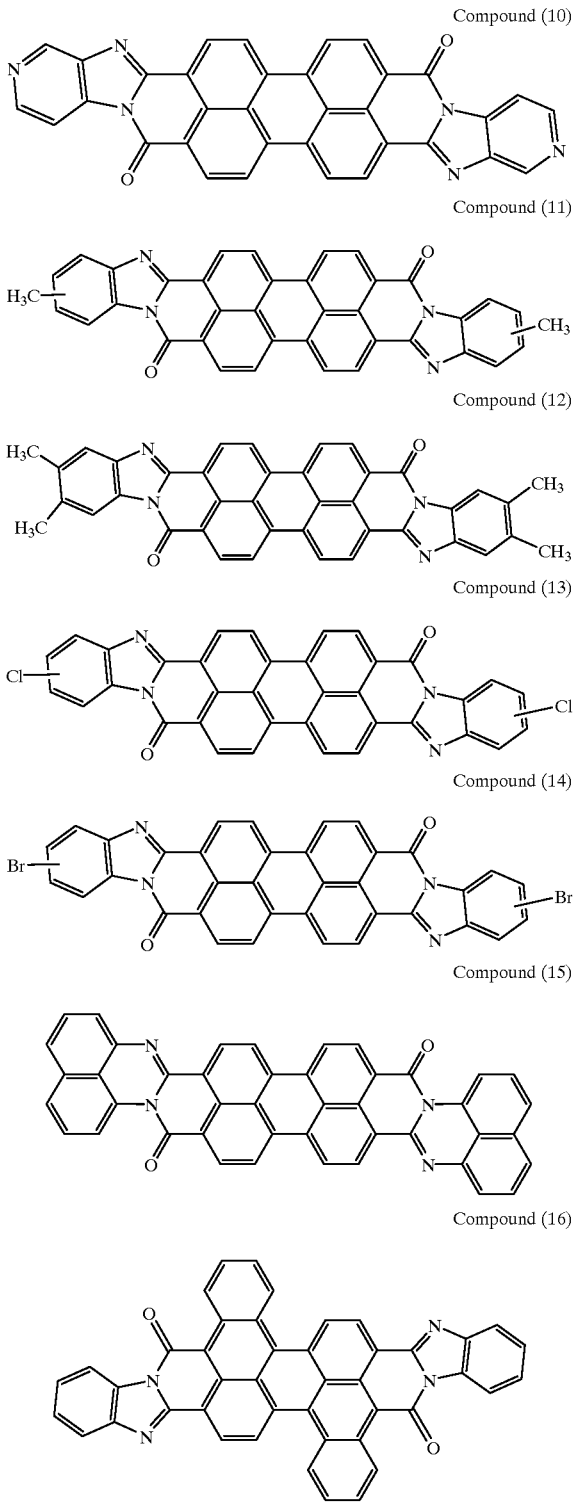

In order to incorporate a metal atom into a polycyclic anhydride-aromatic diamine condensation compound, the polycyclic anhydride-aromatic diamine condensation compound and a metal-containing compound are temporarily allowed to exist in a homogeneous liquid state. Preferred examples of metal-containing compounds are phthalocyanines having a centered metal atom.

Experimentally, the polycyclic anhydride-aromatic diamine condensation compound is regarded as an electron transfer type charge generating material, while the phthalocyanine compound having a centered metal atom is regarded as a hole transfer type charge generating material. It is estimated that phenomena, which have conventionally not been known, occur by employing two types of materials which exhibit different functions. In such a state varying process, some chemical and physical changes may occur.

When a photoreceptor is prepared by mixing fine particles of each of these, specific effects discovered in the present invention are not found. Each solid is allowed to temporarily form a homogeneous liquid state. It is assumed that solid particles are again formed via a state in which solids are mixed in the free molecular state.

Preferred examples of phthalocyanines having a centered metal atom include titanyl phthalocyanine, gallium phthalocyanine, vanadium phthalocyanine, copper phthalocyanine, lead phthalocyanine, zinc phthalocyanine, aluminum phthalocyanine, magnesium phthalocyanine, iron phthalocyanine, and silicone phthalocyanine. Of these, titanyl phthalocyanine, gallium phthalocyanine, vanadium phthalocyanine, and copper phthalocyanine are preferred.

The phthalocyanine compound having a centered metal atom is employed in an amount of 0.01 to 50 percent by weight of the polycyclic anhydride-aromatic diamine condensation compound, preferably in an amount of 0.5 to 20 percent by weight, and most preferably in an amount of 1 to 10 percent by weight.

These compounds are dissolved in a common solvent such as sulfuric acid. Sulfuric acid is employed 30 to 100 times, by weight, compared to the polycyclic anhydride-aromatic diamine condensation compound. These are uniformly dissolved under conditions in which no reaction occurs. For example, stirring is carried out at normal temperature for 30 minutes to 2 hours. Undissolved material is removed by filtration, and deposition is carried out employing a poor solvent for the target substance, for example, water.

After the synthesis of the hybrid pigment particles of the present invention, it is possible to further convert said particles to those having a desired crystal shape, employing methods such as suitable solvent treatment and the like.

Synthesis examples of hybrid pigments will be described below.

SYNTHESIS EXAMPLE 1

At room temperature, 0.3 g of titanyl phthalocyanine and 30 g of bisimidazole perylene illustrated as Compound (1) were added to 900 ml of concentrated sulfuric acid, and the resulting mixture was then stirred for 2 hours. The resulting sulfuric acid solution was filtered with a glass filter, and undissolved material was removed. Thereafter, 15 liters of water were added while maintaining a water temperature below 30° C. After removing deposited particles employing filtration, the resulting particles were washed three times with 5 liters of water. A wet cake obtained by filtration was temporarily frozen. Thereafter, the wet cake was thawed, filtered, and dried to obtain 28 g of Pigment Particle (1).

SYNTHESIS EXAMPLE 2

26.5 g of Pigment Particle (2) were obtained in the same manner as Synthesis Example 1, except that titanyl phthalocyanine was replaced with 0.3 g of copper phthalocyanine.

SYNTHESIS EXAMPLE 3

27 g of Pigment Particle (3) were obtained in the same manner as Synthesis Example 1, except that titanyl phthalocyanine was replaced with 0.3 g of vanadium phthalocyanine.

SYNTHESIS EXAMPLE 4

26 g of Pigment Particle (4) were obtained in the same manner as Synthesis Example 1, except that titanyl phthalocyanine was replaced with 0.3 g of lead phthalocyanine.

SYNTHESIS EXAMPLE 5

28.5 g of Pigment Particle (5) were obtained in the same manner as Synthesis Example 1, except that titanyl phthalocyanine was replaced with 0.3 g of zinc phthalocyanine

SYNTHESIS EXAMPLE 6

29.5 g of Pigment Particle (6) was obtained in the same manner as Synthesis Example 1, except that 3 g of titanyl phthalocyanine was used.

SYNTHESIS EXAMPLE 7

30.5 g of Pigment Particle (7) were obtained in the same manner as Synthesis Example 6, except that titanyl phthalocyanine was replaced with 0.3 g of copper phthalocyanine.

SYNTHESIS EXAMPLE 8

30 g of Pigment Particle (8) was obtained in the same manner as Synthesis Example 6, except that titanyl phthalocyanine was replaced with 3 g of vanadium oxyphthalocyanine.

SYNTHESIS EXAMPLE 9

Pigment particles, which had been prepared in the same manner as Synthetic Example 6, were washed and filtered. Thereafter, in the stage of the wet cake, said pigment particles were placed in a mixture consisting of 500 ml of orthodichlorobenzene (ODB) and 200 ml of water, and stirred at 70° C. for 6 hours. Further the resulting particles were washed well with methanol and then dried to obtain 24 g of Pigment particle (9).

SYNTHESIS EXAMPLE 10

Pigment particles were prepared in the same manner as Synthesis Example 1, except that 13.5 g of titanyl phthalocyanine and 16.5 g of bisimidazole perylene, designated as Compound (1), were used. The resulting pigment particles were washed and filtered. Thereafter, in the stage of the wet cake, said particles were placed in a mixture consisting of 500 ml of orthodichlorobenzene (ODB) and 200 ml of water, and stirred at 70° C. for 6 hours. Further the resulting particles were washed well with methanol and then dried to obtain 25.6 g of Pigment particle (10).

SYNTHESIS EXAMPLE 11

Pigment particles, which had been prepared in the same manner as Synthesis Example 11, were temporarily dried. Thereafter, said particles were placed in 500 ml of 2-butanone. The resulting mixture was heated at reflux while stirring for 6 hours, and further was washed well with methanol to obtain 23.8 g of Pigment particle (11).

SYNTHESIS EXAMPLE 12

Pigment particles was prepared in the same manner as Synthesis Example 1, except that titanylphthalocyanine was replaced by 0.3 g of gallium phthalocyanine to obtain 25.8 g of pigment particles 14.

SYNTHESIS EXAMPLE 13

Pigment particles was prepared in the same manner as Synthesis Example 1, except that titanylphthalocyanine was replaced by 3 g of gallium phthalocyanine to obtain 28.2 g of pigment particles 15.

In the present invention, a laminated type photoreceptor may be prepared by providing a carrier transport layer on the carrier generating layer. Further, a single-layer photoreceptor may be prepared by employing dispersion prepared by dispersing a mixture comprised of the carrier generating material, carrier transport material, and other additives. A photoreceptor may be prepared by providing the charge generating layer on the carrier transport layer. In any of the layer structures, a protective layer may be provided on the photosensitive layer. Further, an interlayer may be provided between an electrically conductive substrate and the photosensitive layer.

During the formation of a photosensitive layer, the carrier generating layer is effectively prepared by employing methods in which a coating composition may be coated, which is prepared by finely dispersing only a carrier generating material, or said carrier generating material together with binders and additives, into a suitable dispersion medium, or a carrier generating material is subjected to vacuum evaporation. In the case of the former, employed as a dispersing means may be homogenizers such as an ultrasonic homogenizer, a ball mill, a sand mill, a homomixer, and the like.

Furthermore, the carrier transport layer may be formed by coating a solution prepared by dissolving only a carrier transport material or said carrier transport material together with binders and additives employing an applicator, a bar coater, a dip coater, a ring coater, and the like. An interlayer, a charge generating layer, a protective layer, and the like may be formed in the same manner as the above.

Polymers which are useful as binders employed in a photosensitive layer as well as in a protective layer include, for example, polystyrene resins, acrylic resins, methacrylic resins, vinyl chloride resins, vinyl acetate resins, polyvinyl butyral resins, epoxy resins, polyurethane resins, phenol resins, polyester resins, alkyd resins, polycarbonate resins, silicone resins, and melamine resins, and copolymers comprising at least two repeating units thereof. Further, in addition to these insulating resins, cited are polymeric organic semiconductors such as polyvinyl-N-carbazole and the like.

Employed as dispersion media for the carrier generating materials well as the carrier transport materials may be, for instance, hydrocarbons such as toluene, xylene, and the like; halogenated hydrocarbons such as methylene chloride, 2-dichloromethane, and the like; ketones such as methyl ethyl ketone, cyclohexanone, and the like; esters such as ethyl acetate, butyl acetate, and the like; alcohols such as methanol, ethanol, propanol, butanol, methyl cellosolve, ethyl cellosolve, and derivatives thereof; ethers such as tetrahydrofuran, 1,4-dioxane, 1,3-dioxolan, and the like; amines such as pyridine, diethylamine; nitrogen containing compounds such as amidos, for example, N,N-dimethylformamide and the like; fatty acids, phenols; and sulfur and phosphorus compounds such as carbon disulfide, trimethyl phosphate, and the like. These may be employed individually or in combination.

The content ratio of the carrier generating material to the binder is preferably between 1 and 600 weight parts per 100 weight parts of the binder. The content ratio of the carrier transport material to the binder is preferably between 10 and 500 weight parts per 100 weight parts of the binder. The thickness of the carrier generating layer is preferably between 0.01 and 20 $\mu$m. The thickness of the carrier transport layer is generally between 1 and 100 μm, and is preferably between 5 and 50 μm. In the case of a single layer type electrophotographic photoreceptor, the ratio of binder: additive: carrier generating material: carrier transport material is preferably 100:1 to 200:1 to 200:1 to 200. The thickness of the formed photosensitive layer is preferably between 5 and 50 μm.

Employed as electrically conductive supports may be a metal plate and a metal drum, and in addition, those prepared by providing electrically conductive compounds such as electrically conductive polymers, indium oxide, and the like, or a thin layer of metal such as aluminum, palladium, and the like onto a substrate such as paper, plastic film, and the like, employing means such as coating, deposition, laminating, and the like.

Employed as carrier transport materials of the photosensitive layer of the present invention may be any of several compounds such as triphenylamine derivatives, triphenylamine-styryl derivatives, hydrazone derivatives, tetraphenylbenzidine, butadiene derivatives, and the like. Specific examples of these compounds are shown below:

(T-1)

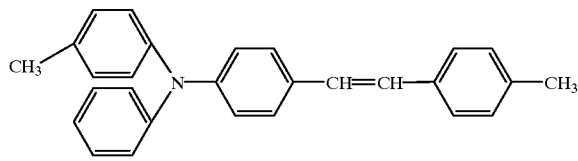

(T-2)

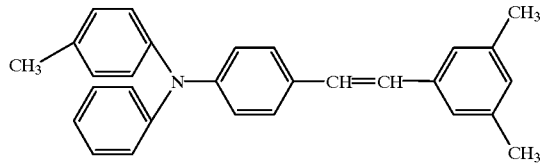

(T-3)

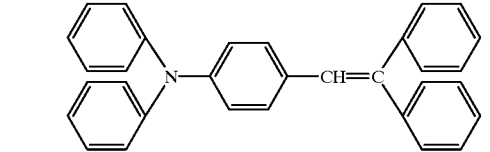

(T-4)

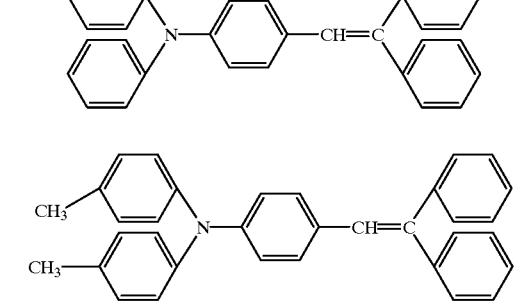

(T-5)

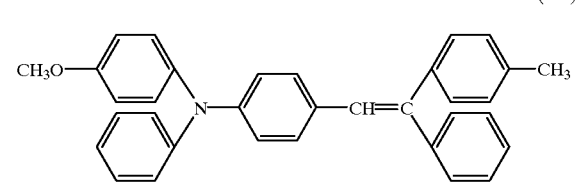

(T-6)

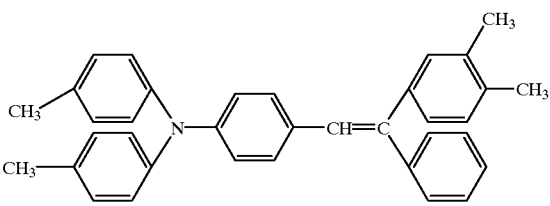

(T-7)

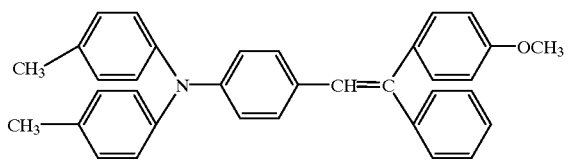

(T-8)

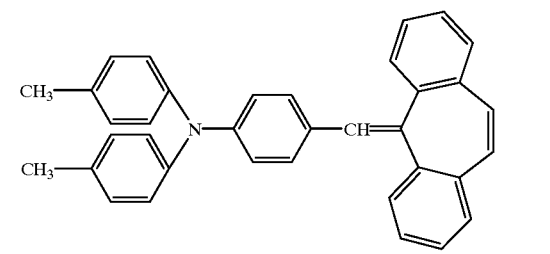

(T-9)

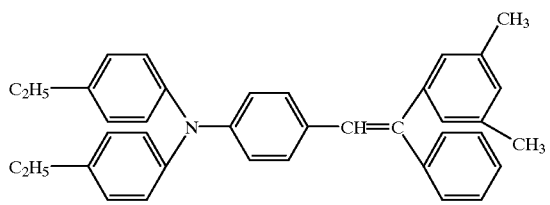

(T-10)

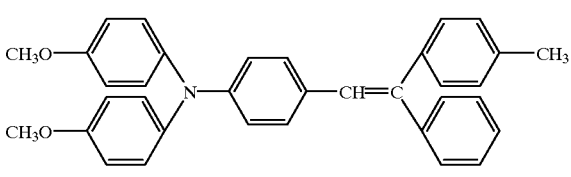

(T-11)

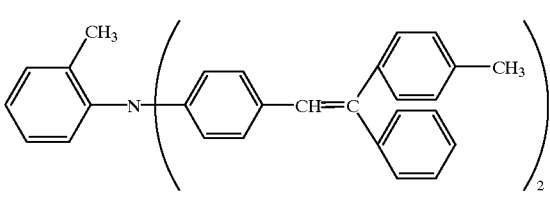

(T-12)

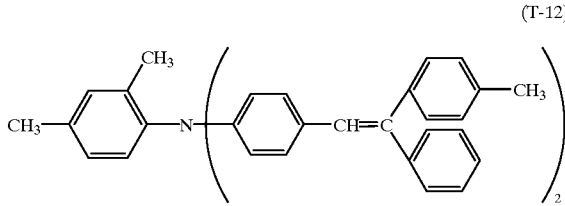

(T-13)
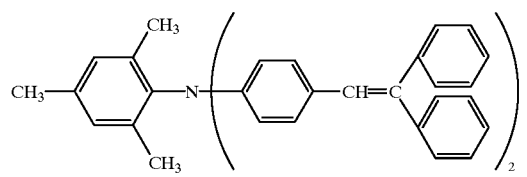
(T-14)
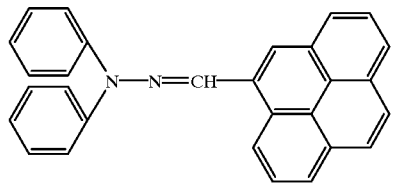
(T-15)
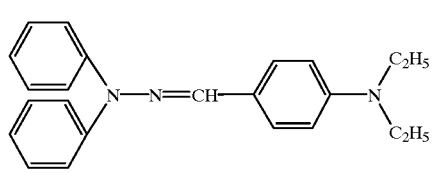
(T-16)
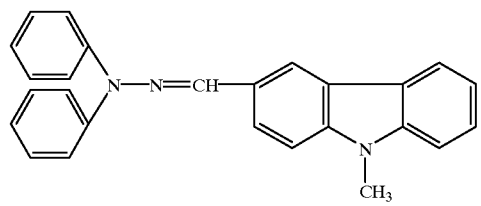
(T-17)
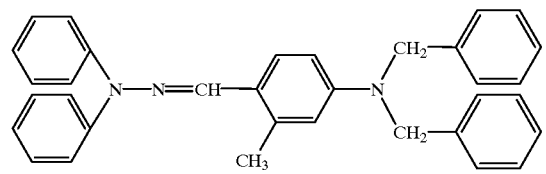
(T-18)
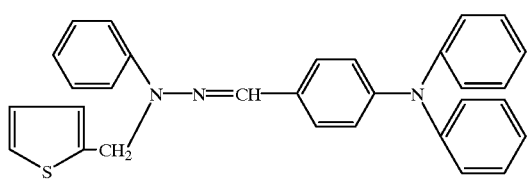
(T-19)
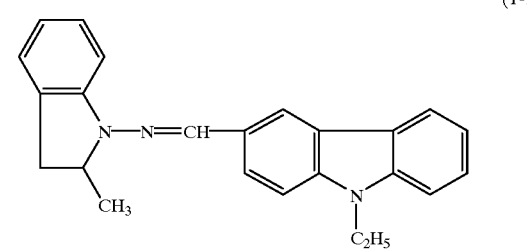
(T-20)
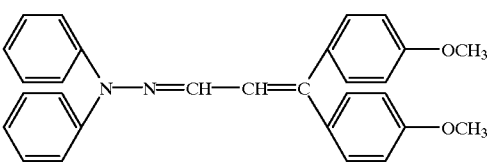
(T-21)
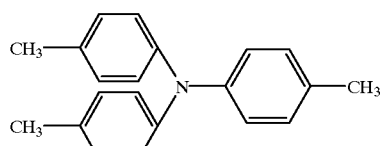
(T-22)
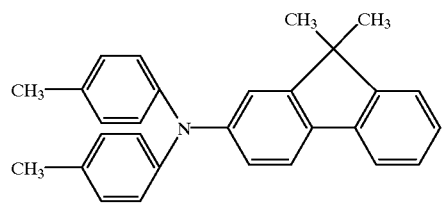
(T-23)
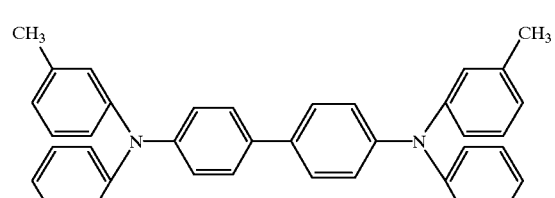
(T-24)
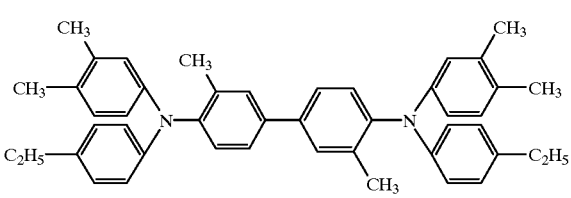
(T-25)
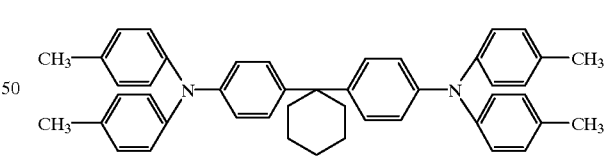
(T-26)
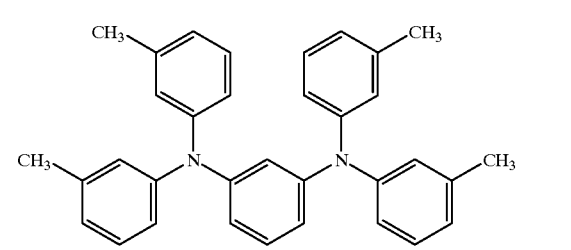

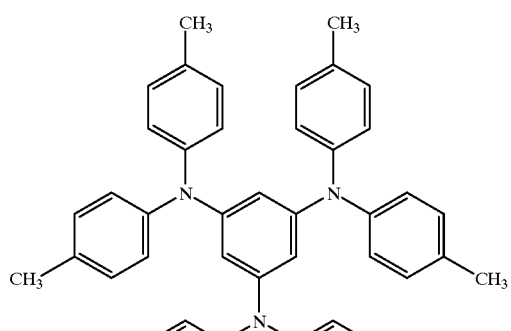
(T-27)

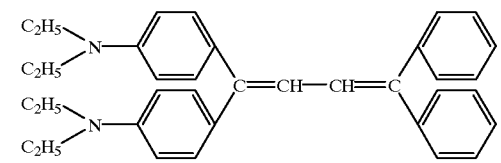
(T-28)

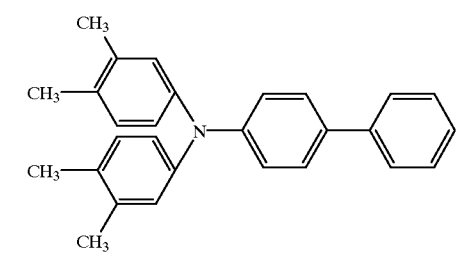
(T-29)

Further, antioxidants may be incorporated into the photosensitive layer. Cited as antioxidants are hindered phenols, hindered amines, paraphenylenediamines, hydroquinones, organic phosphorus compounds, and the like.

Furthermore, the photoreceptor may contain other additives such as UV absorbers to protect the photosensitive layer, as well as spectral sensitivity correcting dyes.

By employing said photoreceptor, it is possible to obtain a preferred image from the first sheet without carrying out prior exposure, employing an idling step before copying. This fact serves to decrease limitations upon designing an image forming apparatus, resulting in great economic savings.

Next, the image forming method of the present invention will be described, with reference to FIG. 1, which illustrates the example of the construction cross-sectional view showing one example of the electrophotographic image forming method.

As shown in FIG. 1, based on information read by an original document reading unit (not shown), an exposure beam is emitted from semiconductor laser beam source 1. Said exposure beam is bent perpendicular toward a sheet of paper employing polygonal mirror 2, and is irradiated onto the photoreceptor surface via fθ lens 3, which corrects image deformation, to form an electrostatic latent image. Photoreceptor drum 4 is uniformly charged in advance, and starts rotating clockwise synchronizing with the exposure beam.

An electrostatic latent image on the surface of said photoreceptor drum is developed by development unit 6, and the resulting developed image is transferred onto transfer sheet 8 synchronously conveyed through the action of transfer unit 7. Further, the transfer sheet 8 is separated from the photoreceptor drum 4 employing separation unit (separation pole) 9, but the developed image remained on the transfer sheet 8, was introduced to fixing unit 10, and subsequently fixed.

Non-transferred toner, and the like, which remains on the photoreceptor surface is removed by cleaning unit 11, employing a cleaning blade method, whereby residual charge is removed by pre-charging exposure (PCL) 12, and the photoreceptor is uniformly recharged by charging unit 5 for subsequent image formation.

Further, the transfer sheet 8 is typically a sheet of plain paper, however a PET base for OHP and the like are other options.

Furthermore, the cleaning blade 13 is composed of an elastic rubber body having a thickness of about 1 to about 30 mm, and urethane rubber is most frequently employed as the material.

EXAMPLES

The present invention will specifically be explained with reference to examples. However, the present invention is not limited to these examples. "Parts" in the present examples means "weight parts" unless otherwise specified.

Example 1

Employing a wire bar, an about 0.5 μm thick interlayer comprised of copolymerized nylon CM8000 (manufactured by Toray Industries, Inc.) was provided on a PET film deposited with aluminum. Employing a wire bar, coated onto the resulting interlayer was a dispersion prepared by dispersing a mixture comprised of 1.5 parts of Pigment particle (1), 0.5 part of butyral resin, 10 parts of cyclohexanone, and 40 parts of 2-butanone, employing a sand mill. Subsequently coated, employing a doctor blade, onto the charge generating layer was a solution prepared by dissolving 0.65 part of a carrier transport material (Compound A) represented by the structure shown below, and 1 part of polycarbonate resin "IUPILON Z200" (manufactured by Mitsubishi Gas Kagaku Inc.) in 7.5 parts of dichloroethane. An about 24 μm thick charge transport layer was formed, and thus Photoreceptor Example 1 was prepared.

Compound (A)

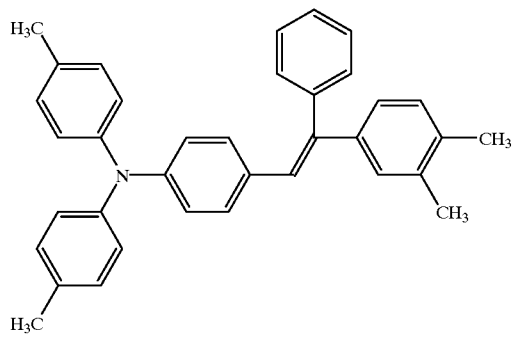

Examples 2 through 10

Photoreceptors were prepared in the same manner as Example 1, except that Pigment particle (1) was replaced with the pigment particles of the synthesis example shown in Table 1.

Example 11

An interlayer comprised of copolymerized nylon CM8000 (manufactured by Toray Industries, Inc.) was provided on a cylindrical aluminum base body employing dip coating so as to obtain a coated amount of 2.7 mg/100 cm². Onto the resulting interlayer, employing a dip coating, coated was a composition prepared by dispersing a mixture comprised of 1.5 parts of Pigment particle (1), 0.5 part of butyral resin, 10 parts of cyclohexanone, and 40 parts of 2-butanone employing a sand mill, and a charge generating layer having an absorbance at the wavelength of 680 nm of about 1.1 was formed. Subsequently, onto the resulting charge generating layer, coated was a composition prepared by dissolving 0.65 part of a carrier transport material (Compound A) and 1 part of polycarbonate resin "IUPILON-Z200" (manufactured by Mitsubishi Gas Kagaku, Inc.) in 7.5 parts of dichloroethane employing dip coating so as to obtain a layer thickness of about 24 μm to prepare Photoreceptor 9 (in the present Examples, photoreceptor formula is basically the same as Example 1 except for the electrically conductive base body).

Comparative Example 1

Comparative Photoreceptor Example 1 was prepared in the same manner as Example 1, except that Pigment particle 1 was replaced with Compound (1).

Comparative Example 2

Pigment particle (12) was prepared in the same manner as Synthesis Example 1, except that titanyl phthalocyanine was replaced with dibromoanthanthrone (Compound B). Comparative Photoreceptor 2 was prepared in the same manner as Example 1, except that Pigment particle (1) was replaced with Pigment particle (12).

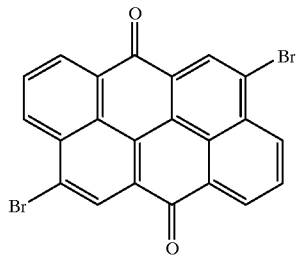

Compound (B)

Comparative Example 3

Pigment particle (13) was prepared in the same manner as Synthesis Example 1, except that titanyl phthalocyanine was replaced with metal free phthalocyanine. Comparative Photoreceptor Example was prepared in the same manner as Example 1, except that Pigment particle (1) was replaced with Pigment particle (13).

Comparative Example 4

Employing a wire bar, an about 0.5 μm thick interlayer comprised of copolymerized nylon CM8000 (manufactured by Toray Industries, Inc.) was provided on a PET film deposited with aluminum. Coated, employing a wire bar, onto said interlayer was a dispersion prepared by dispersing mixture comprised of 1.5 parts of Compound (1), 0.015 part of chlorogallium phthalocyanine, 0.5 part of butyral resin, 10 parts of cyclohexanone, and 40 parts of 2-butanone, employing a sand mill, and an about 0.3 μm thick charge transfer layer was formed. Subsequently, coated, employing a doctor blade, onto the charge generating layer was a solution prepared by dissolving 0.65 part of a carrier transport material (Compound A) and 1 part of polycarbonate resin "IUPILON-Z200" (manufactured by Mitsubishi Gas Kagaku, Inc.) in 7.5 parts of dichloroethane. An about 24 μm thick charge transport layer was formed, and thus Comparative Photoreceptor Example 4 was prepared.

Comparative Example 5

Employing a wire bar, an about 0.5 μm thick interlayer comprised of copolymerized nylon CM8000 (manufactured by Toray Industries, Inc.) was provided on a PET film deposited with aluminum. Coated, employing a wire bar, onto the resulting interlayer was a dispersion prepared by dispersing mixture comprised of 1.5 parts of Compound (1), 0.015 part of titanyl phthalocyanine, 0.5 part of butyral resin, 10 parts of cyclohexanone, and 40 parts of 2-butanone, employing a sand mill, and an about 0.3 μm thick charge generating layer was formed. Subsequently, coated, employing a doctor blade, onto the charge generating layer was a solution prepared by dissolving 0.65 part of a carrier transport material (Compound A) and 1 part of polycarbonate resin "IUPILON-Z200" (manufactured by Mitsubishi Gas Kagaku, Inc.) in 7.5 parts of dichloroethane. An about 24 μm thick charge transport layer was formed, and thus Comparative Photoreceptor Example 5 was prepared.

Comparative Example 6

Comparative Photoreceptor Example 6 was prepared in the same manner as Example 11, except that pigment particles of Compound (1), in which metal phthalocyanine was not hybridized, was employed as a charge generating material (in the present Comparative Example, the photoreceptor formula is basically the same as Comparative Example 1 except for the electrically conductive base body).

Comparative Example 7

An interlayer comprised of copolymerized nylon CM8000 (manufactured by Toray Industries, Inc.) was provided onto an cylindrical aluminum base body, employing dip coating so as to obtain a coated amount of 2.7 mg/100 cm². Onto the resulting layer, employing dip coating, was applied a composition prepared by dispersing a mixture comprised of 1 part of titanyl phthalocyanine having peaks at 9.5°, 24.1°, and 27.2° of Bragg angle 2θ±0.20 with respect to CuKα specific X-ray, 0.5 part of silicone-butyral resin, and 50 parts of t-butyl acetate, employing a sand mill, and a charge generating layer having an absorbance of 2 at a wavelength of 680 nm was formed. Subsequently, onto the resulting charge generating layer, employing dip coating, was coated a solution prepared by dissolving 0.65 part of carrier transport material (Compound A) and 1 part of polycarbonate resin "IUPILON-Z200" (manufactured by Mitsubishi Gas Kagaku, Inc.) in 7.5 parts of dichloroethane so as to obtain a layer thickness of about 24 μm, and thus Comparative Photoreceptor Example 7 was prepared.

X-ray Diffraction Measurement

Figure 2:
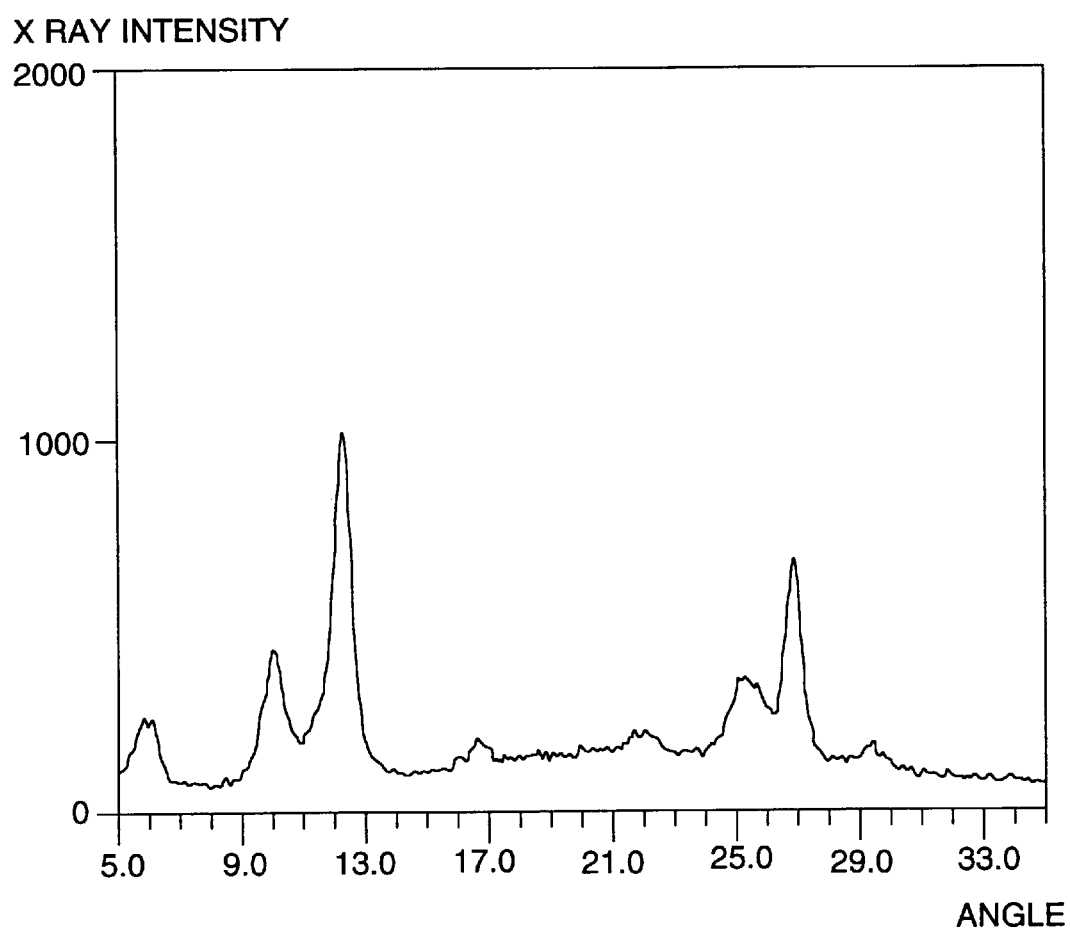
FIG. 2 is an X-ray diffraction diagram of a powder after dispersion of pigment particles of Synthesis Example 3.

FIG. 2 shows the results of X-ray diffraction measurement of the powder prepared by pulverizing an about 1 mm thick coating layer which had been prepared by dispersing pigment particles in Synthesis Example 3 according to the method described in Example 1, and thereafter by coating and drying the resulting dispersion. The X-ray diffraction measurement was also carried out for other particles which had been dispersed in the same manner as above.

Figure 3:
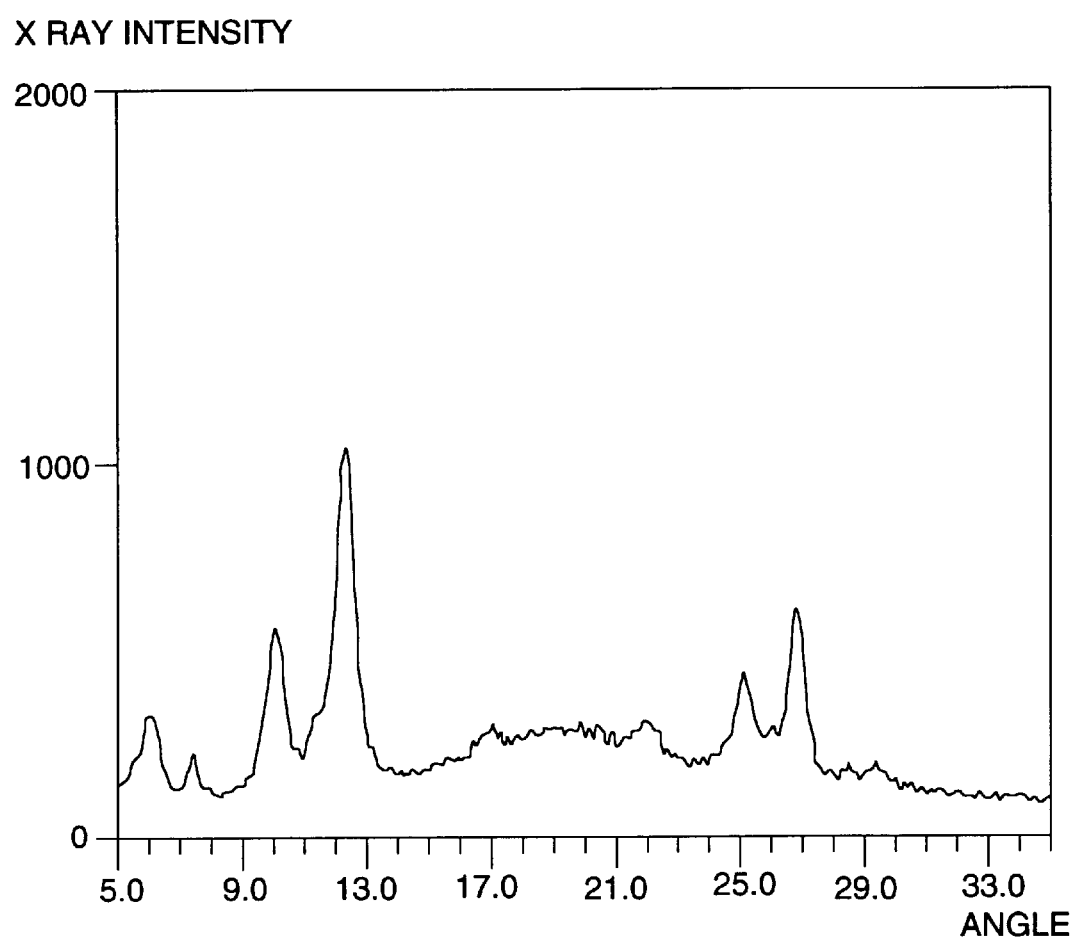
FIG. 3 is an X-ray diffraction diagram of a powder after dispersion of pigment particles of Synthesis Example 6.

FIG. 3 shows the X-ray diffraction results of the powders which had been subjected to dispersion of Synthesis Example 6.

Figure 4:
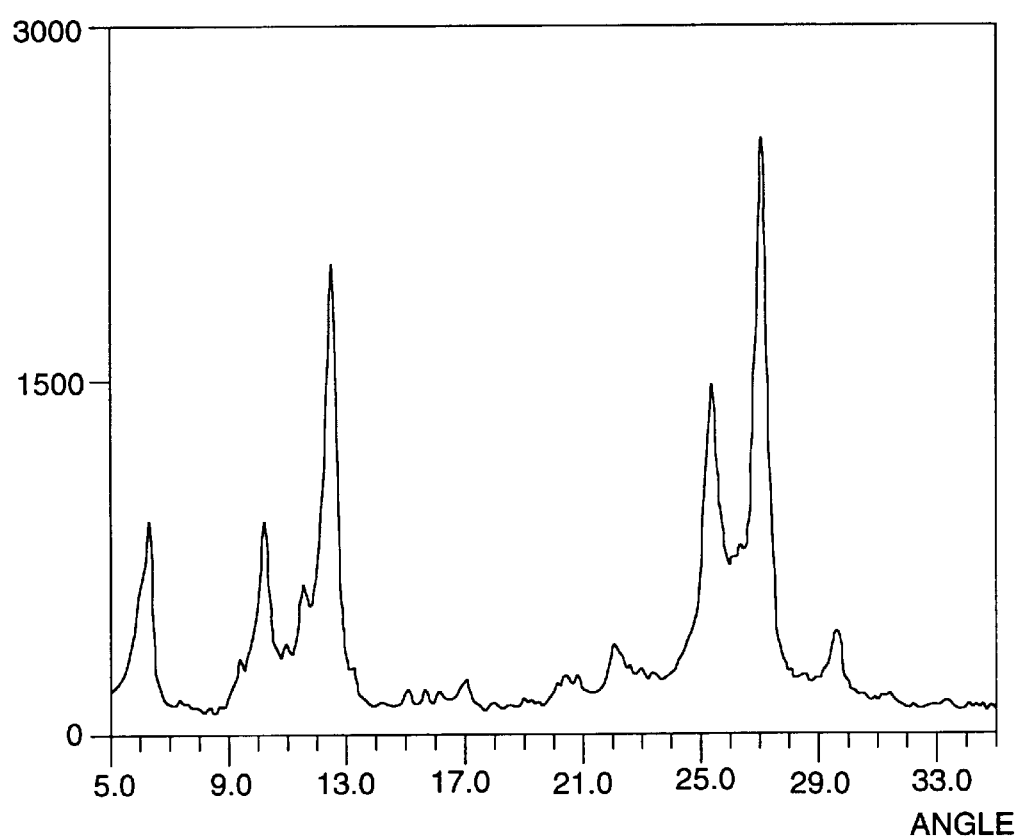
FIG. 4 is an X-ray diffraction diagram of a powder of pigment particles of Synthesis Example 9.
Figure 5:
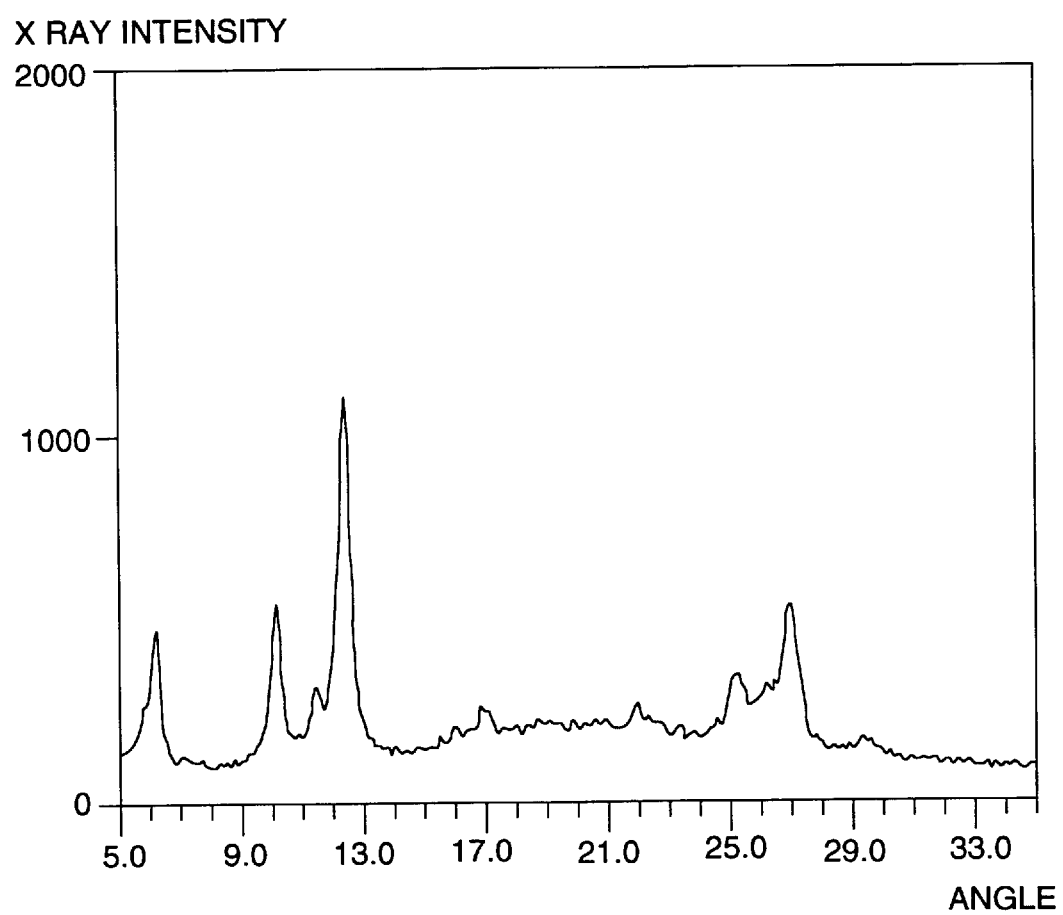
FIG. 5 is an X-ray diffraction diagram of a powder after dispersion of particles of Synthesis Example 9.

FIG. 4 shows the X-ray diffraction results of the powder of the pigment particles of Synthesis Example 9, and FIG. 4 shows the results after dispersion.

Figure 6:
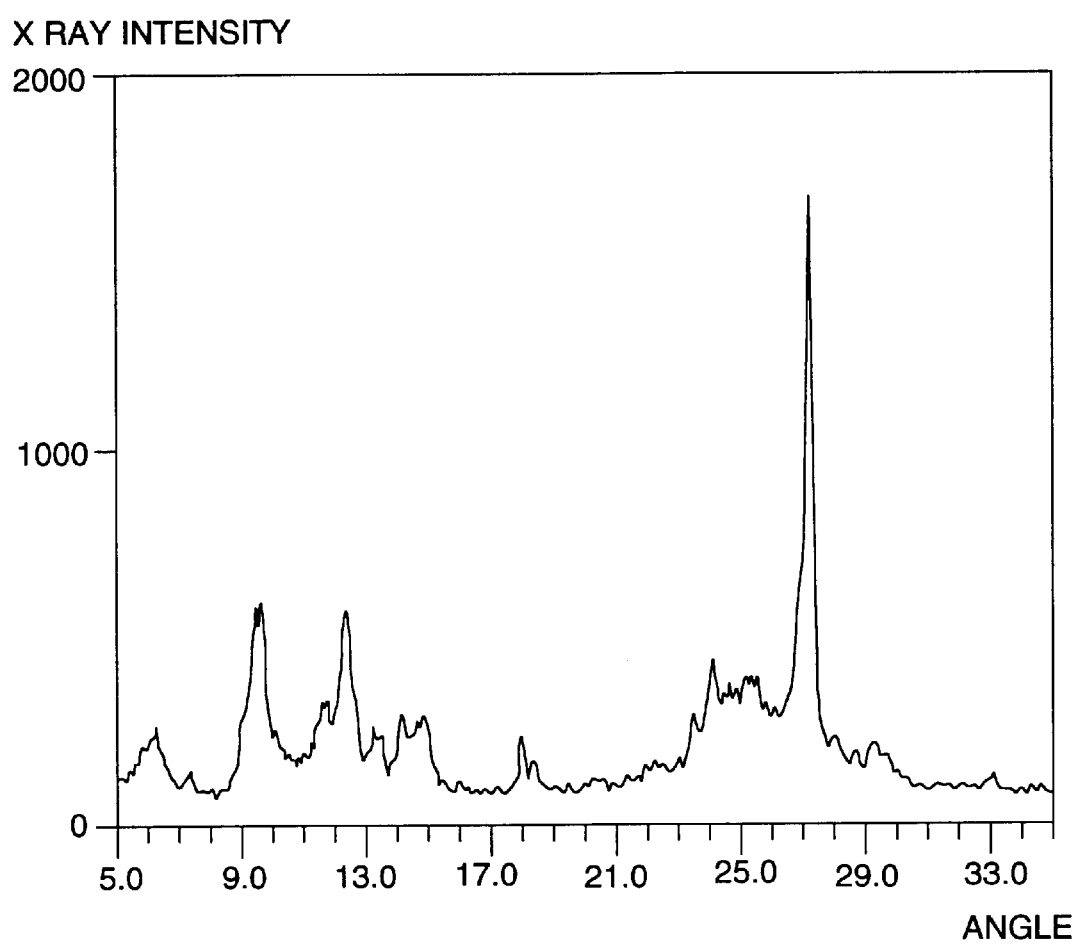
FIG. 6 is an X-ray diffraction diagram of a powder of pigment particles of Synthesis Example 10.
Figure 7:
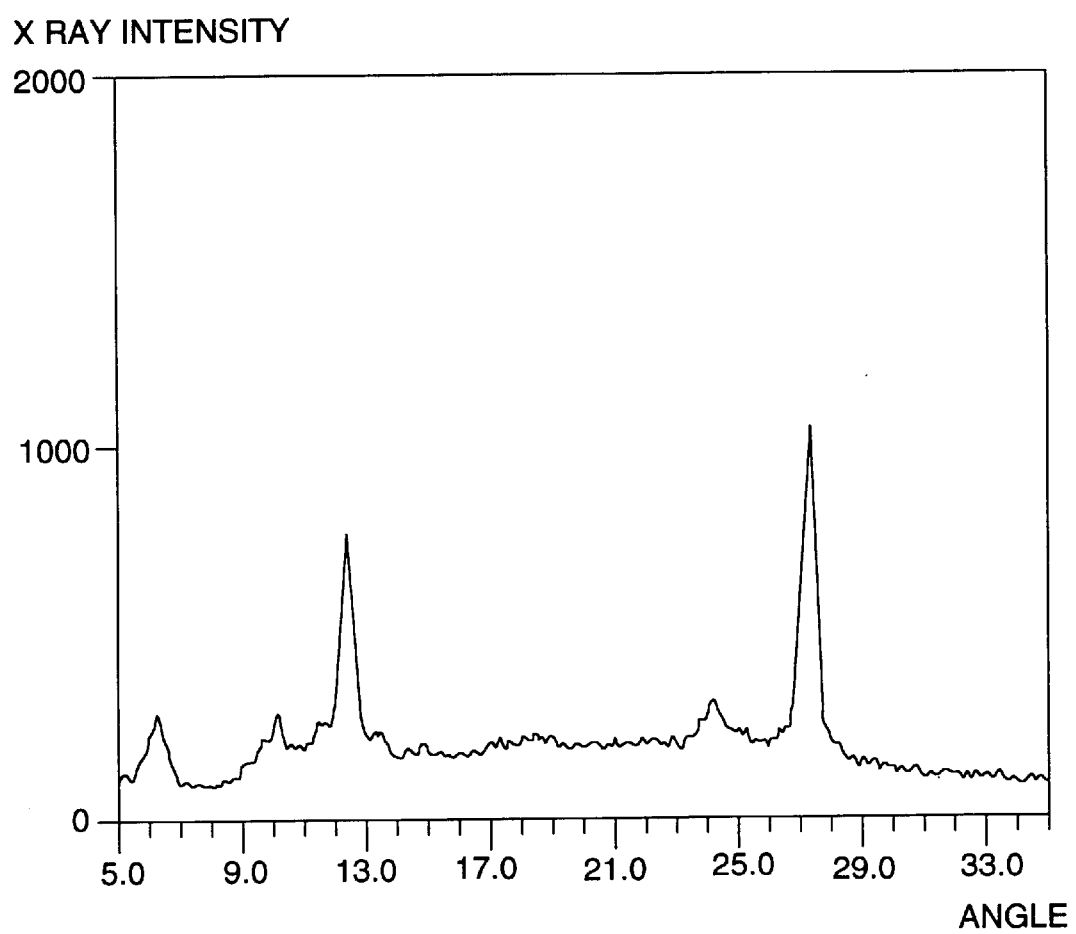
FIG. 7 is an X-ray diffraction diagram of a powder after dispersion of pigment particles of Synthesis Example 10.

FIG. 6 shows the X-ray diffraction results of the powder of the pigment particles of Synthesis Example 10, and FIG. 7 shows the results after dispersion.

Figure 8:
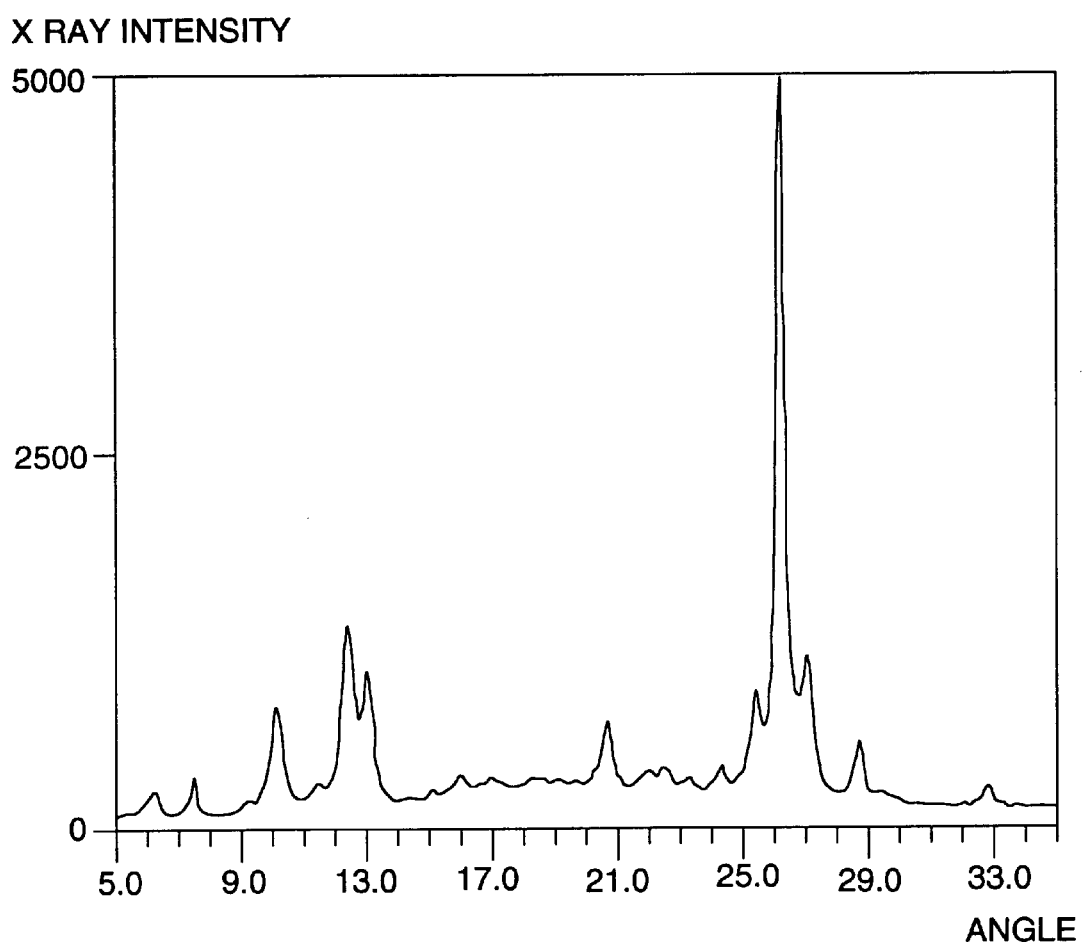
FIG. 8 is an X-ray diffraction diagram of a powder after dispersion of pigment particles of Synthesis Example 11.

FIG. 8 shows the X-ray diffraction results of the powder after dispersion of Synthesis Example 11.

Evaluation 1

The following evaluation was carried out in order to confirm the stability of photoreceptor properties during exposure at high intensity of light.

Electrophotographic photoreceptors obtained by Examples 1 through 8 and Comparative Examples 1 through 5 were exposed for a definite time 5 cm from a 100 V/60 W white electric light source. Electrophotographic properties before and after exposure were evaluated employing a Paper Analyzer EPA8100 (manufactured by Kawaguchi Denki Co.). Table 1 shows necessary light amount E500/50 (in lux and second) to attenuate a surface electric potential of $-500$ V to $-50$ V. while Va represents electric potential after charging.

TABLE 1

| Embodiment | Exposure Time | Pigment Particles | $-Va$ (V) | $\Delta Va$ | E500/50 (lux · sec) | $\Delta E$ |
|---|---|---|---|---|---|---|
| Example 1 | 60 minutes | Synthesized Pigment (1) | 889/938 | 49 | 0.87/1.05 | 0.18 |
| Example 2 | 60 minutes | Synthesized Pigment (2) | 1026/1105 | 79 | 0.92/1.34 | 0.42 |
| Example 3 | 60 minutes | Synthesized Pigment (3) | 1085/1119 | 34 | 0.85/1.09 | 0.24 |
| Example 4 | 60 minutes | Synthesized Pigment (4) | 998/1021 | 23 | 0.89/1.30 | 0.41 |
| Example 5 | 60 minutes | Synthesized Pigment (5) | 1066/1097 | 31 | 0.92/1.35 | 0.43 |
| Example 6 | 30 minutes | Synthesized Pigment (6) | 1026/1005 | −21 | 1.08/1.01 | −0.07 |
| Example 7 | 30 minutes | Synthesized Pigment (7) | 974/996 | 22 | 0.98/1.36 | 0.38 |
| Example 8 | 30 minutes | Synthesized Pigment (8) | 1022/1050 | 28 | 0.96/1.28 | 0.32 |
| Example 9 | 60 minutes | Synthesized Pigment (14) | 981/1023 | 42 | 0.90/1.08 | 0.18 |
| Example 10 | 60 minutes | Synthesized Pigment (15) | 1022/1087 | 65 | 0.96/1.31 | 0.35 |
| Comparative Example 1 | 60 minutes | Compound (1) pigment | 1152/1286 | 134 | 0.80/1.67 | 0.87 |
| Comparative Example 2 | 60 minutes | Synthesized Pigment (12) | 1123/1244 | 121 | 0.81/1.73 | 0.92 |
| Comparative Example 3 | 60 minutes | Synthesized Pigment (13) | 1221/1327 | 106 | 0.88/1.76 | 0.88 |
| Comparative Example 4 | 60 minutes | Pigment Mixture | 1185/1130 | 145 | 0.83/1.74 | 0.91 |
| Comparative Example 5 | 60 minutes | Pigment Mixture | 1086/1188 | 102 | 0.85/1.71 | 0.86 |

As can clearly be seen from Table 1, in Photoreceptor Examples 1 through 8, in which the pigments of the present invention are employed as the charge generating materials, exhibit minimal variation $\Delta Va$ of charging potential (Va) after exposure at high intensity of light is small compared to Comparative Photoreceptor Examples 1 through 5, and variation $\Delta E$ of light sensitivity E500/50 is also improved to below one half compared to Comparative Photoreceptor Examples.

Evaluation 2

The following evaluations were carried out to confirm the image consistency during repeated copying.

In ambient conditions of temperature between 24 and 28° C. and relative humidity between 54 and 84 percent, 44,000 A4 sheets were practically copied employing a modified Konica-7050 (with negative charging polarity, reversal development, and a light source with a wavelength of 680 nm). Regarding Example 11 and Comparative Examples 6 and 7, an initial copy image after repetition as well as copy image after copying 44,000 sheets was evaluated while paying attention to items described below.

Staining on white background: image defect in which originally white background is entirely subjected to development with toner due to a decrease in charging (white background) potential (VH).

Intermediate density variation: image defects in which the initial image density is not reproduced due to variation of the potential of an electrostatic latent image on the photoreceptor surface. The variation of the density (intermediate density) corresponding to the intermediate electric potential (VM) between the charging (white background) electric potential (VH) and the highest image density (VL).

First copy image: image defects, if any, as the result of the first rotation of a photoreceptor are shown.

Table 2 shows the results.

TABLE 2

| Embodiment | White Background Stain | Intermediate Density Variation | Image on 1st Copy |
|---|---|---|---|
| Example 11 | none | none | no image defect |
| Comparative Example 6 | none | density decrease | density decrease |
| Comparative Example 7 | formed | none | background stain |

An initial copy image after repetition exhibited no defect for all photoreceptors. However, image defects after copying 44,000 sheets, as shown in Table 2, were observed in Comparative Example.

On the other hand, in Example 11 of the present invention, excellent images were obtained after repeated copying. Based on the evaluation described above, the photoreceptor of the present invention only minimized all image defects after repeated copying and achieved to produce excellent copy images.

Table 3 shows the variation of the surface electric potextial after inactivity during copying.

TABLE 3

| Embodiment | Number of Copies | VH (−V) | DV (V) | VM (−V) | VL (−V) |
|---|---|---|---|---|---|
| Example 11 | initial | 785 | 4 | 316 | 60 |
|  | after copying 44,000 sheets | 784 | 6 | 304 | 48 |
| Comparative Example 6 | initial | 820 | 8 | 320 | 55 |
|  | after copying 44,000 sheets | 889 | 13 | 452 | 152 |
| Comparative Example 7 | initial | 825 | 15 | 263 | 37 |
|  | after copying 44,000 sheets | 770 | 79 | 288 | 56 |

In the variation of the surface electric potential of the photoreceptor, it was confirmed that VM and VL of Comparative Example 6 increased (corresponding to a decrease in density), VH of comparative Example 7 decreased (corresponding to background staining), and ΔV (difference between VH at the first rotation of the photoreceptor and VH at the second rotation of the same) increased (corresponding to the background staining of the image at a first rotation of the photoreceptor). It is found that photoreceptors in Examples exhibited a uniform electric potential after repeated copying, which is not much different from initial copies, and as a result, the above-mentioned image defects do not occur.

Evaluation 3

The consistency of copy images in ambient conditions of low temperature and low humidity was evaluated.

Following Evaluation 2, 40,000 A3 sheets were practically copied at ambient conditions of temperature of 11° C. and 11% RH, employing a modified Konica-7050 (with negative charging polarity, reversal development, and a light source with a wavelength of 680 nm).

Evaluation was carried out regarding the charging (white background) electric potential (VH), the electric potential (VL) of the highest image density, its intermediate electric potential (VM), and ΔV (difference between VH of the first rotation of the photoreceptor and VH of the second rotation of the same).

Tables 4 and 5 show the results.

TABLE 4

| Embodiment | Image Quality |
|---|---|
| Example 11 | no image defect from the first copy to the copy after copying 40,000 sheets |
| Comparative Example 6 | no problem during initial run, marked decrease in the intermediate density during successive copying |
| Comparative Example 7 | decease in intermediate density during initial run, and high background staining on the first copy |

TABLE 5

| Electric Potential Properties Electric Potential (V) | Example 11 | |
|---|---|---|
|  | Initial | After copying 40,000 sheets |
| VH (−V) | 769 | 770 |
| ΔV (V) | 0 | 6 |
| VM (−V) | 316 | 327 |
| VL (−V) | 75 | 79 |

As can be seen from Tables 4 and 5, in Comparative Examples, image defects were observed during initial copying or copying after inactivity. However, the photoreceptors of the present invention were capable of uniformly forming excellent images in ambient conditions of low temperature as well as low humidity. At the time, the surface electric potential of the photoreceptors was very stable as shown in Table 5.

Evaluation 4

In ambient conditions of high temperature as well as high humidity, the consistency of copied image quality was evaluated according to the method described below.

Following Evaluation 3, 40,000 A3 sheets were practically copied at ambient conditions of 30° C. and 82% RH, employing a modified Konica-7050 (with negative charging polarity, reversal development, and a light source with a wavelength of 680 nm).

Evaluation was carried out regarding the charging (white background) electric potential (VH), the electric potential (VL) of the highest image density, its intermediate electric potential (VM), and ΔV (difference between VH of the first rotation of the photoreceptor and VH of the second rotation of the same).

The results are shown in Tables 6 and 7.

TABLE 6

| Embodiment | Image Quality |
|---|---|
| Example 11 | no image defect from the first copy to the 40,000th copy |
| Comparative Example 6 | no problem during initial run, and marked decrease in the intermediate density during successive copying |
| Comparative Example 7 | high background staining on the first copy during successive copying |

TABLE 7

| Electric Potential Properties | Example 11 | |
|---|---|---|
| Electric Potential (V) | Initial | After copying 40,000 sheets |
| VH (−V) | 771 | 792 |
| ΔV (V) | 13 | 0 |
| VM (−V) | 298 | 302 |
| VL (−V) | 54 | 40 |

As can be seen from Tables 6 and 7, in Comparative Examples, image defects were observed during initial copying or copying after inactivity. However, the photoreceptors of the present invention were capable of uniformly forming excellent images in ambient conditions of low temperature as well as low humidity. At the time, the surface electric potential of the photoreceptor of Example 11 was very stable as shown in Table 7.

Evaluation 5

Employing the modified copier used in Evaluation 2, the power source was turned off immediately after charging, and after 60 seconds, the electric potential maintaining ratio on the photoreceptor surface was measured. Table 8 shows the results.

TABLE 8

| Embodiment | Electric Potential Maintaining Ratio (%) |
|---|---|
| Example 11 | 87.2 |
| Comparative Example 3 | 0 |

As shown in Table 8, it is found that the photoreceptor of the present invention achieves excellent electric potential maintaining performance compared to the conventional photoreceptor.

Effects Of The Invention

As shown in the results of Evaluations 1 through 5, the following performances have been markedly improved employing the photoreceptor in which the pigment of the invention is employed as the charge generating material, compared to conventional photoreceptors.
(1) The degradation of sensitivity is minimal due to exposure at high intensity of light.
(2) After successive use, the difference in chargeability of a photoreceptor between its first rotation and its second rotation is minimal.

Owing to improvements in these properties, it was possible to provide consistent copy images under all conditions such as exposure with high intensity light, repeated use, ambient conditions such as low temperature and humidity and high temperature and humidity. Furthermore, under the same conditions, when an image is formed at the first rotation of the photoreceptor, an excellent copy image was obtained. On the other hand, when conventional photoreceptors are employed, defects resulted in copy images under any of these conditions.

As described above, by employing the photoreceptor in which the pigment of the present invention is used as a charge generating material, it has become possible to obtain consistent copy images under various ambient conditions as well as processes.

What is claimed is:

1. An electrophotographic photoreceptor comprising a charge generating layer containing hybrid pigment particles obtained by incorporating one or more metal atoms into polycyclic anhydride-aromatic diamine condensation compound particles.

2. The electrophotographic photoreceptor of claim 1 wherein number of condensed rings of the polycyclic anhydride-aromatic diamine condensation compound is between 2 and 7.

3. An electrophotographic photoreceptor comprising a charge generating layer containing pigment particles obtained by incorporating at least one phthalocyanine compound having a centered metal atom into polycyclic anhydride-aromatic amine condensation compound particles.

4. An electrophotographic photoreceptor of claim 1 wherein the polycyclic anhydride-aromatic diamine condensation compound is Compound (1), bisimidazole perylene, represented by the structure described below.

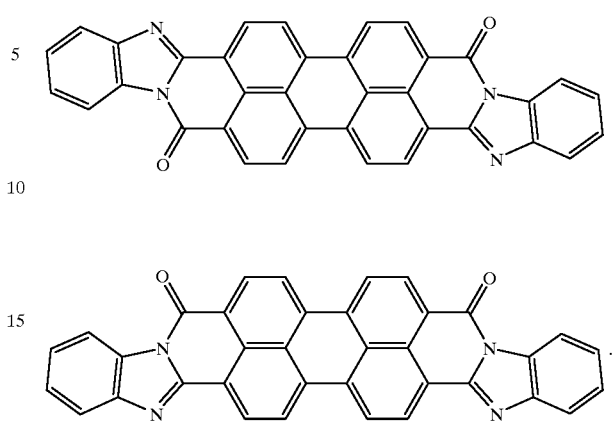

Compound (1)

5. The electrophotographic photoreceptor of claim 1 wherein said metal can be any of Ti, Cu, Fe, V, Ga, Si, Pb, Al, Zn, and Mg.

6. The electrophotographic photoreceptor of claim 1 wherein the pigment is contained in a charge generating layer as a charge generating substance.

7. The electrophotographic photoreceptor of claim 1 wherein the weight of said polycyclic anhydride-aromatic diamine condensation compound is at least the same as that of a phthalocyanine compound.

8. Pigment particles which are prepared by incorporating at least one phthalocyanine compound having a centered metal atom in bisimidazole perylene particles of which structure is shown as Compound (1), and the weight of the phthalocyanine compound having a centered metal atom is between at least 0.01 and below 50 percent of the total weight of the particles.

9. A production method for pigment particles in which after allowing a phthalocyanine compound having a centered metal atom and a polycyclic anhydride-aromatic diamine condensation compound to form a uniform solution, said pigment particles are obtained via a granulating process upon adding said solution into a poor solvent.

10. A production method of pigment particles in which after preparing a homogeneous solution by dissolving a phthalocyanine compound having a centered metal atom and a polycyclic anhydride-aromatic diamine condensation compound in sulfuric acid, the resulting solution is poured in.

11. A method of forming an image wherein the photoreceptor of claim 1 is employed and an image is formed from first rotation of the photoreceptor by reversal development.

12. An electrophotographic photoreceptor of claim 3 wherein the polycyclic anhydride-aromatic diamine condensation compound is Compound (1), bisimidazole perylene, represented by the structure described below.

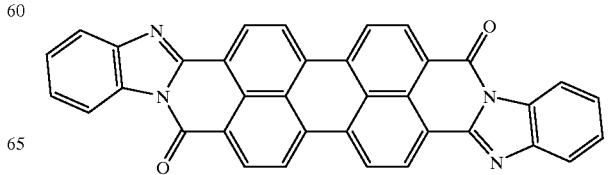

Compound (1)

-continued
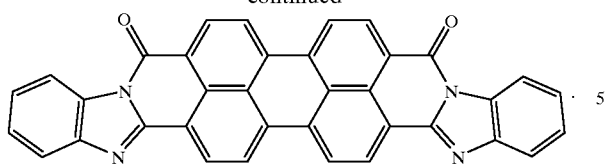
13. The electrophotographic photoreceptor of claim 12 wherein at least one of said metal atoms is incorporated into said photoreceptor by introduction of at least one phthalocyanine compound having a central metal atom.
* * * * *